(12) United States Patent
Yamada

(10) Patent No.: US 8,654,388 B2
(45) Date of Patent: Feb. 18, 2014

(54) INFORMATION PROCESSING APPARATUS THAT TRANSFORMS AN OUTPUT SETTING OF A PREDETERMINED FORMAT INTO A SETTING DESCRIBED IN AN ORIGINAL FORMAT

(71) Applicant: Satoru Yamada, Kanagawa (JP)

(72) Inventor: Satoru Yamada, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/834,754

(22) Filed: Mar. 15, 2013

(65) Prior Publication Data

US 2013/0208293 A1 Aug. 15, 2013

Related U.S. Application Data

(63) Continuation of application No. 12/868,004, filed on Aug. 25, 2010, now Pat. No. 8,427,686.

(30) Foreign Application Priority Data

Sep. 14, 2009 (JP) ................................. 2009-211574
Jun. 14, 2010 (JP) ................................. 2010-134857

(51) Int. Cl.
*G06K 15/00* (2006.01)
*G06F 3/12* (2006.01)

(52) U.S. Cl.
USPC ........................................ 358/1.15; 358/1.13

(58) Field of Classification Search
USPC ............... 358/1.1, 1.9, 1.13, 1.14, 1.15, 1.18, 358/426.03, 539; 382/232, 235, 276, 303, 382/304

See application file for complete search history.

(56) References Cited

U.S. PATENT DOCUMENTS

| 7,408,674 B2 | 8/2008 | Moro et al. |
| 2002/0089683 A1 | 7/2002 | Moro et al. |
| 2008/0130044 A1 | 6/2008 | Yamada |

FOREIGN PATENT DOCUMENTS

JP 2008-97574 4/2008

*Primary Examiner* — Gabriel Garcia
(74) *Attorney, Agent, or Firm* — Oblon, Spivak, McClelland, Maier & Neustadt, L.L.P.

(57) ABSTRACT

A printer driver includes an assigning unit that assigns a setting value based on storage location information specifying a storage location for each setting value; a compressing unit that converts each of the setting values thus assigned to have a format identifying each storage location, and generates compressed data therefrom; a storage unit that stores each piece of the compressed data compressed by the compressing unit in a storage location specified by the storage location information; a first decompressing unit and a second decompressing unit that decompress the compressed data stored in the storage location; a setting window displaying unit that displays a print setting window using each of the setting values obtained by decompression performed by the first decompressing unit; and a print data generating unit that generates print data using each of the setting values obtained by decompression performed by the second decompressing unit.

7 Claims, 19 Drawing Sheets

FIG.4

```
[
 {"type" : "CheckBox", "name" : "duplex",
    "axis" : {
           "x":25, "y":30
           }
 },
 {"type" : "ComboBox", "name" : "orientation",
    "axis" : {
           "x":25, "y":60
           }
 },
 {"type" : "SpinBox", "name" : "copies",
    "axis" : {
           "x":25, "y":90
           }
 },
]
```

LAYOUT DATA FOR DOUBLE-SIDED PRINT SETTING

LAYOUT DATA FOR PRINT ORIENTATION SETTING

LAYOUT DATA FOR NUMBER OF COPIES SETTING

```
"registry" :
{
            "finisher"
            "hdd"
            "fold"
                :
},
"devmode" :
{
            "duplex",
            "orientation",
                :
},
```

FIG.7

```
FUNCTION INFORMATION

<feature name="duplex" default="off" type="pickone">
        <pickone name="off"/>
        <pickone name="on"/>
        <pickone name="righttop"/>
    </feature>

<feature name="orientation" default="portrait" type="pickone">
        <pickone name="portrait"/>
        <pickone name="landscape"/>
    </feature>

<feature name="copies" default="1" type="nmber">
        <range min="1"max="999">
    </feature>

⋮
```

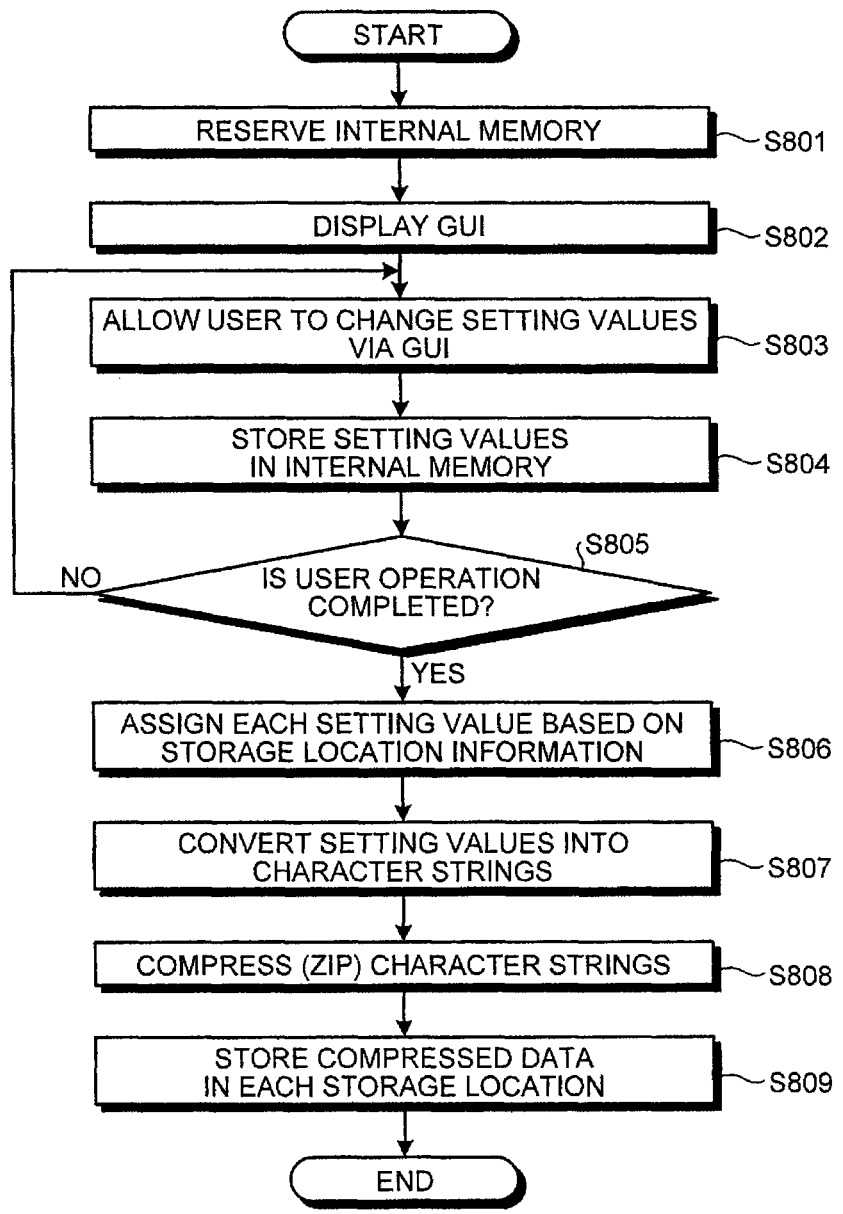

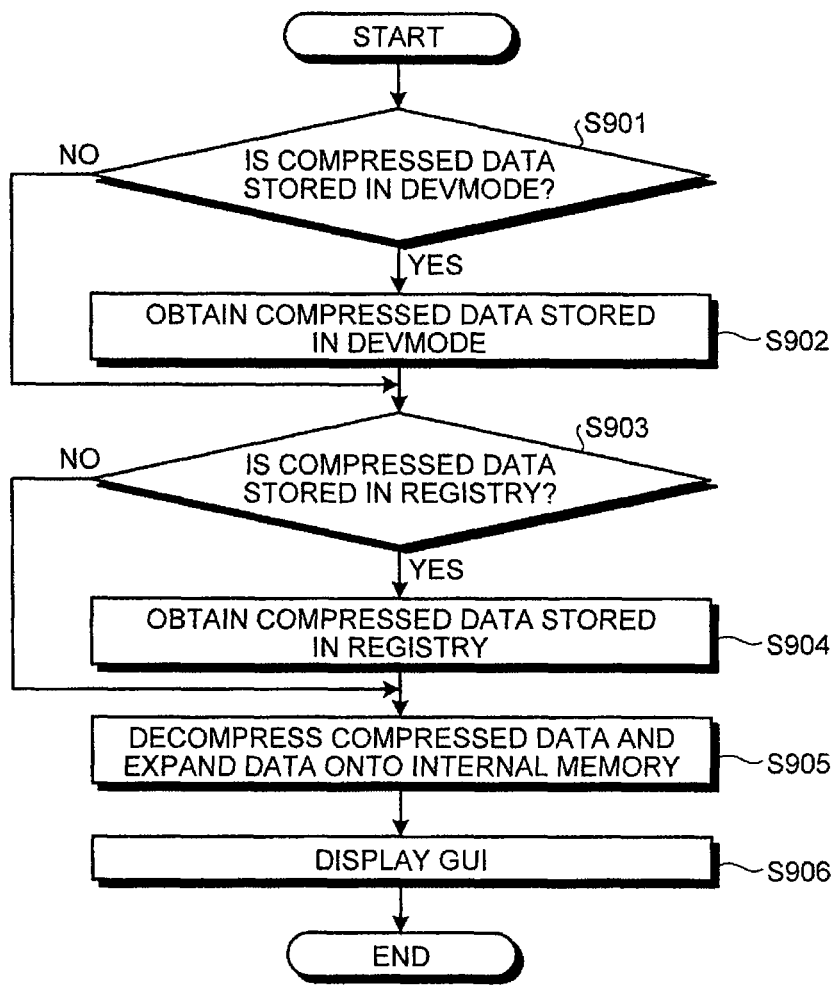

FIG.13

```
"registory" :
{
            "finisher"
            "hdd"
            "fold"
                 ⋮
}, "devmode" :
{
            "duplex",
            "orientation",
                 ⋮
}, "plugin" :
{
            "watermark_text",
            "watermark_color",
                 ⋮
}
```

FIG.15

```
FUNCTION INFORMATION

<feature name="duplex" default="off" type="pickone">
    <pickone name="off"/>
    <pickone name="on"/>
    <pickone name="righttop"/>
</feature>

<feature name="orientation" default="portrait" type="pickone">
    <pickone name="portrait"/>
    <pickone name="landscape"/>
</feature>

<feature name="copies" default="1" type="nmber">
    <range min="1"max="999">
</feature>

<feature name="watermark_text" default="top secret" type="pickone">
    <pickone name="top secret"/>
    <pickone name="confidential"/>
          :
</feature>

<feature name="watermark_color" default="gray" type="pickone">
    <pickone name="gray"/>
    <pickone name="red"/>
          :
</feature>
```

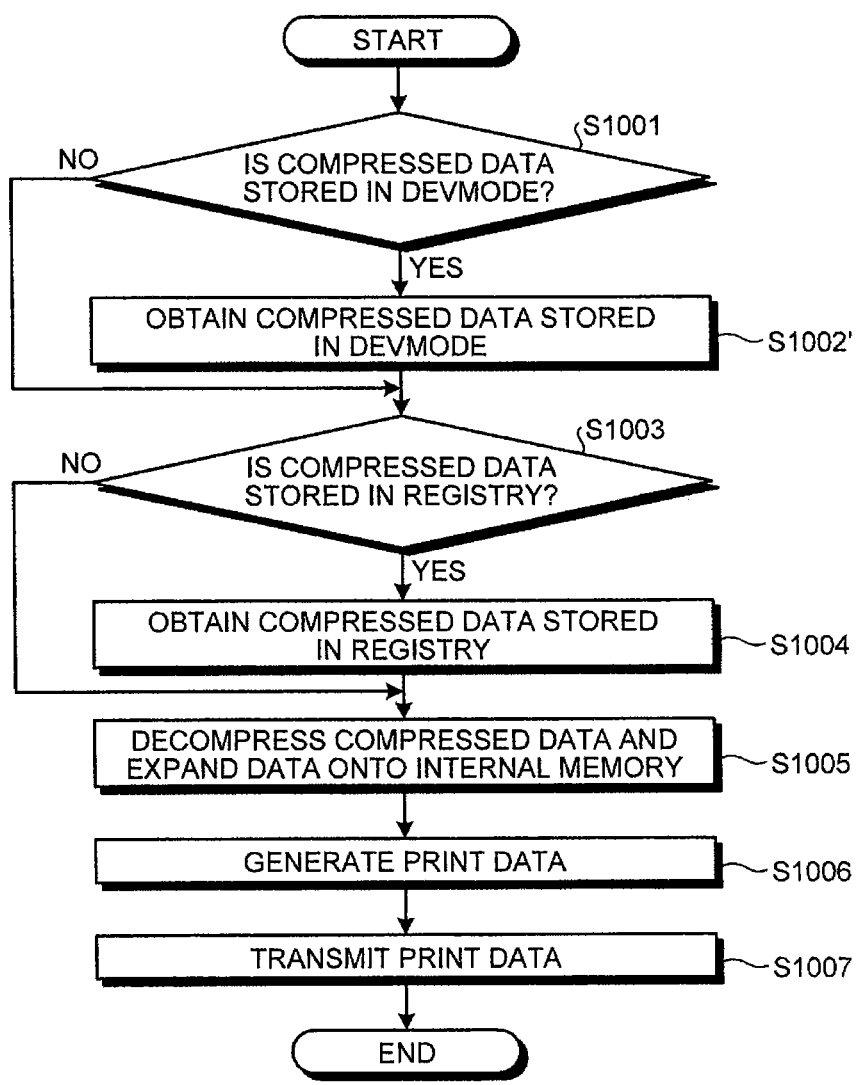

INFORMATION PROCESSING APPARATUS THAT TRANSFORMS AN OUTPUT SETTING OF A PREDETERMINED FORMAT INTO A SETTING DESCRIBED IN AN ORIGINAL FORMAT

CROSS-REFERENCE TO RELATED APPLICATIONS

This application is a continuation of U.S. Ser. No. 12/868,004, filed Aug. 25, 2010, which claims priority to and incorporates by reference the entire contents of Japanese Patent Application No. 2009-211574 filed in Japan on Sep. 14, 2009 and Japanese Patent Application No. 2010-134857 filed in Japan on Jun. 14, 2010.

BACKGROUND OF THE INVENTION

1. Field of the Invention

The present invention relates to a printer driver, an information processing apparatus, and a computer-readable recording medium recording therein a printer driver.

2. Description of the Related Art

Printers of different models have different functions, and sometimes an option is added to extend such functions. For example, if a finisher is attached to or removed from the main body of a printer, a number of usable functions increases or decreases. If the number of functions increases or decreases, an amount of information such as setting values that a printer driver must store therein also increases or decreases.

To address such an issue, has been disclosed a technology for generating data that can be processed by a printer without the need for printer function extensions. For example, according to the technology disclosed in Japanese Patent Application Laid-open No. 2008-097574, in a data structure storing therein print settings (for example, a Devmode structure), an area is reserved for print setting values that are set based on function setting information related to printer functions, and the print setting values are assigned to the area. The function setting information is referred to when the printer-processable data is generated from the print setting values assigned to the data structure. The technology disclosed in Japanese Patent Application Laid-open No. 2008-097574 can generate such data that can be processed by a printer without the need for printer function extensions by adopting such a structure.

In a conventional printer driver, setting values have always been stored in a data structure format, in the same manner as disclosed in Japanese Patent Application Laid-open No. 2008-097574.

However, this data structure has a format that stores data in a computer program, and its data structure is statically determined when it is coded. Therefore, if the number of printer functions increases or decreases, especially if the number increases, the data structure must be updated (re-designed). In other words, the data structure must be re-coded and re-compiled to extend the data structure storing therein print settings. Therefore, a modified printer driver must be re-created and re-distributed to support the printer function extensions.

SUMMARY OF THE INVENTION

It is an object of the present invention to at least partially solve the problems in the conventional technology.

According to an object of the present invention, there is provided a printer driver including: an assigning unit that assigns a setting value based on storage location information specifying a storage location for each setting value; a compressing unit that converts each of the setting values thus assigned to have a format identifying each storage location, and generates compressed data therefrom; a storage unit that stores each piece of the compressed data compressed by the compressing unit in a storage location specified by the storage location information; a first decompressing unit and a second decompressing unit that decompress the compressed data stored in the storage location; a setting window displaying unit that controls a display of a print setting window using each of the setting values obtained by decompression performed by the first decompressing unit; and a print data generating unit that generates print data interpretable by a printer using each of the setting values obtained by decompression performed by the second decompressing unit.

According to another aspect of the present invention, there is provided an information processing apparatus installed with a printer driver, wherein the printer driver includes: an assigning unit that assigns a setting value based on storage location information specifying a storage location for each setting value; a compressing unit that converts each of the setting values thus assigned to have a format identifying each storage location, and generates compressed data therefrom; a storage unit that stores each piece of the compressed data compressed by the compressing unit in a storage location specified by the storage location information; a first decompressing unit and a second decompressing unit that decompress the compressed data stored in the storage location; a setting window displaying unit that controls a display of a print setting window using each of the setting values obtained by decompression performed by the first decompressing unit; and a print data generating unit that generates print data interpretable by a printer using each of the setting values obtained by decompression performed by the second decompressing unit.

According to still another aspect of the present invention, there is provided a computer-readable recording medium recording therein the printer driver above described.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic of an example of layout information according to the first embodiment;

FIG. 7 is a schematic of an example of function information according to the first embodiment;

FIG. 8 is a flowchart for explaining an operation (setting) performed by a print setting module according to the first embodiment;

FIG. 9 is a flowchart for explaining an operation (displaying a GUI) performed by the print setting module according to the first embodiment;

FIG. 13 is a schematic of an example of storage location information according to the second embodiment;

FIG. 15 is a schematic of an example of function information according to the second embodiment;

FIG. 20 is a flowchart for explaining an operation performed by a drawing module according to the second embodiment.

DETAILED DESCRIPTION OF THE PREFERRED EMBODIMENTS

Printer systems according to exemplary embodiments of the present invention are described below in details with reference to the accompanying drawings.

First Embodiment

Overall Configuration of Printer System

Figure 1:
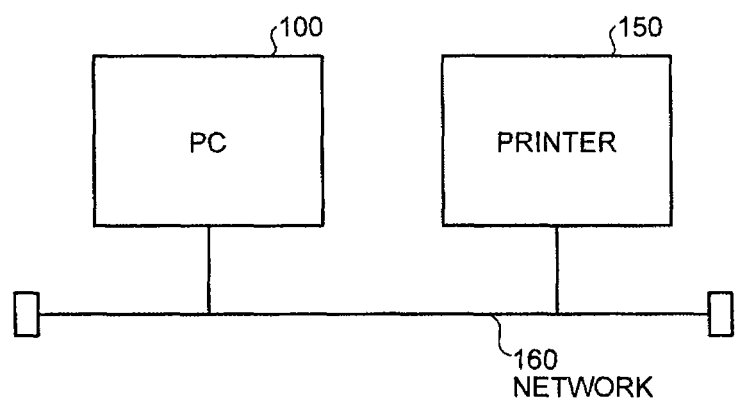
FIG. 1 is a schematic of an overall configuration of a printer system according to a first embodiment of the present invention.

FIG. 1 is a schematic of an overall configuration of a printer system according to a first embodiment of the present invention. As illustrated in FIG. 1, in the first embodiment, a personal computer (PC) 100 and a printer 150 are connected via a network 160. The printer 150 executes printing in response to a print request issued by the PC 100.

Configuration of PC 100

Figure 2:
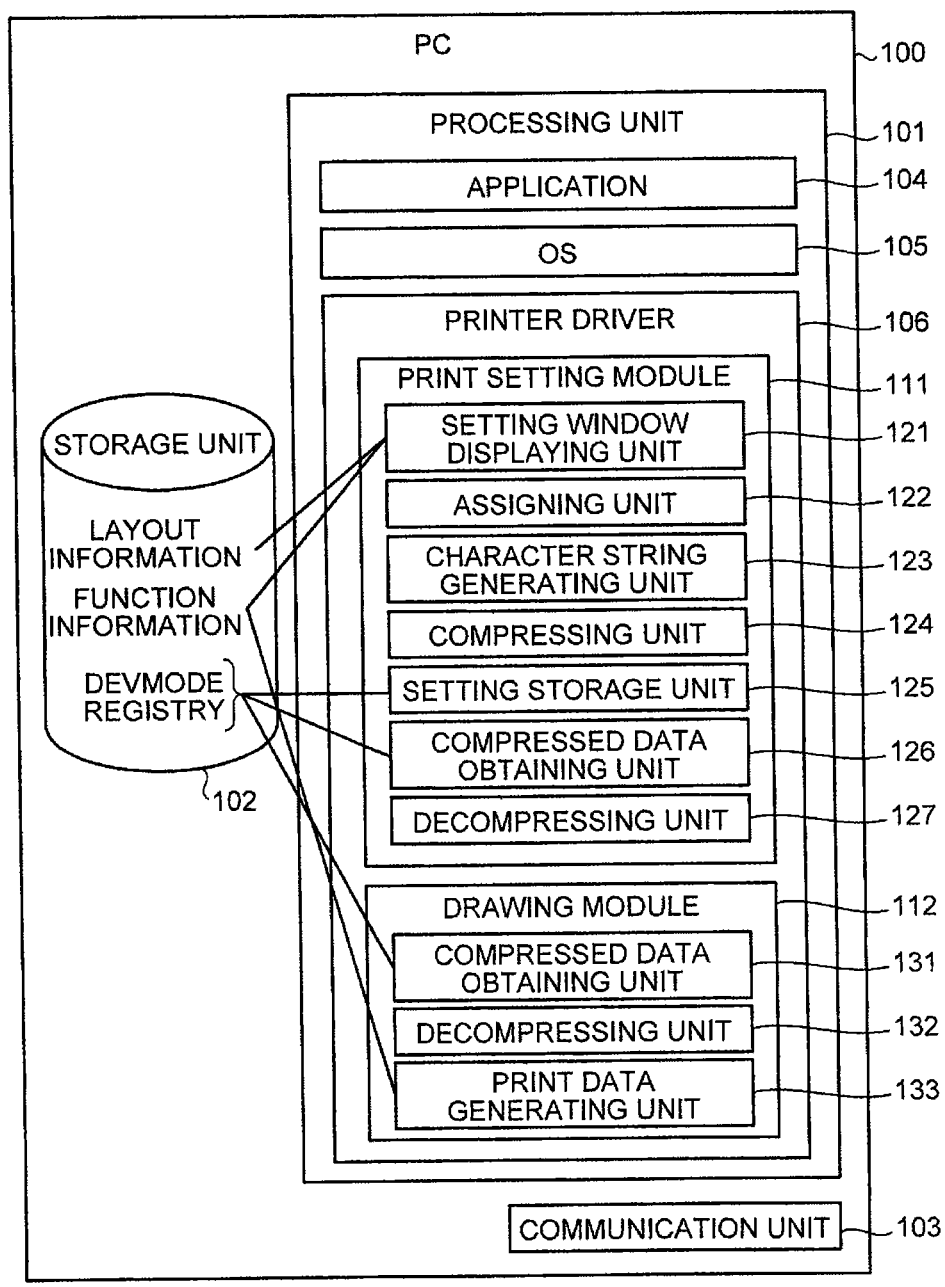
FIG. 2 is a block diagram of a configuration of a PC according to the first embodiment.
Figure 3:
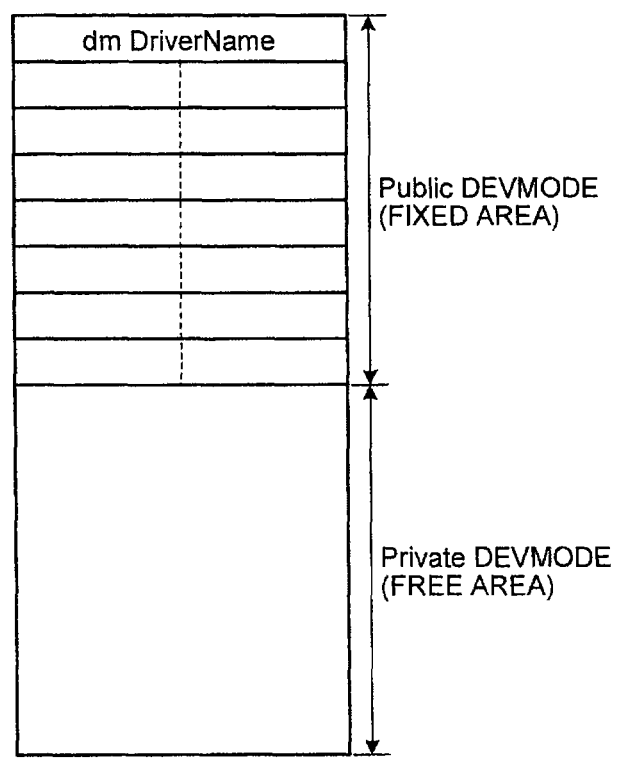
FIG. 3 is a schematic of a DEVMODE structure according to the first embodiment.

FIG. 2 is a block diagram of a configuration of the PC 100. As illustrated in FIG. 2, the PC 100 includes a processing unit 101, a storage unit 102, and a communicating unit 103. The processing unit 101 includes a central processing unit (CPU), not illustrated, as a controller, and a set of memories including a read-only memory (ROM) and a random access memory (RAM) functioning as a main memory. When the PC 100 is booted and executed, an application 104, an operating system (OS) 105, and various drivers (only a printer driver 106 is illustrated in FIG. 2) are loaded from the ROM and the storage unit 102 onto the main memory and expanded thereon, and executed by the CPU. The PC 100 has a hardware configuration of a common computer with an input device such as a keyboard or a mouse, and an output device such as a display, which are not illustrated in FIG. 2 for simplicity of explanations.

The functional blocks included in the printer driver 106 illustrated in FIG. 2 represent main functions or units that implement controls of the printer 150.

The communicating unit 103 exchanges information with the printer 150 connected through the network 160.

The application 104 is a software allowing a user to give a print instruction. If the user wishes to print data edited on the application 104, the application 104 accepts the printer instruction issued by the user. At this time, the application 104 does not generate print data to be sent to the printer 150 alone, but passes information to be printed and a print request corresponding to the print instruction to the OS 105.

The OS 105 is a computer program for managing hardware and software on the PC 100. The OS 105 performs controls such as starting a computer program, reading or storing information, and the like. Well-known examples of the most typical OSes include Microsoft Windows (registered trademark) and UNIX (registered trademark). The OS 105 passes information to be printed (e.g., document data or image data) as well as the print request received from the application 104 to the printer driver 106.

The storage unit 102 is a storage for storing therein various information. More specifically, the storage unit 102 is a hard disk drive (HDD), for example. The information stored in the storage unit 102 includes setting information defining information related to processes for implementing the functions of the printer driver 106 (any information required in the processes, such as setting values used for the processes, or display information allowing the setting values to be changed). Examples of the setting information include layout information, storage location information, and function information. In addition, a DEVMODE structure and a registry provided by the OS 105 are also stored in the storage unit 102.

The layout information is information describing a layout of a graphical user interface (GUI) component to be displayed on a setting window. The storage location information is information specifying information about the location where each of the setting values is stored. The function information is information specifying information related to functions (specifications) of a connected printer, a range in which each of the setting values is permitted to be set, or constraints among the settings.

The printer driver 106 includes a print setting module 111 for controlling a user interface (UI), and a drawing module 112 for controlling drawing, as a set of modules for performing the functions included in the driver.

The print setting module 111 includes a setting window displaying unit 121, an assigning unit 122, a character string generating unit 123, a compressing unit 124, a setting storage unit 125, a compressed data obtaining unit 126, and a decompressing unit 127.

The setting window displaying unit 121 controls a display of a GUI (print setting window) displayed on a monitor screen as a UI. The setting window displaying unit 121 according to the first embodiment displays the print setting window based on the layout information stored in the storage unit 102. Upon displaying the print setting window, the setting window displaying unit 121 displays GUI components only for the functions that are permitted to use, and the settings that are permitted to be set (a range of settings, setting values) under the constraints.

The assigning unit 122 refers to the storage location information, and assigns each of the setting values to a storage location specified in the storage location information.

The character string generating unit 123 converts a setting value assigned by the assigning unit 122 into a character string of a variable length, which is a pair of the name and the value of the setting, for each of the storage locations. For example, a character string such as {"Duplex":"on", "Orientation":"portrait", . . . } is generated. In this character string, the name of a setting functions as an identifier for indentifying each of the setting values, or as an address of a setting value.

The compressing unit 124 compresses, by means of zipping for example, the character strings respectively corresponding to the storage locations and generated by the character string generating unit 123, to generate compressed data for each of the storage locations. Because the data size is reduced by the compression, an increase in the size of the compressed data stored in the DEVMODE structure, which is a data structure of a fixed size, can be suppressed even if the number of setting values increases. Any type of compression schemes may be used.

The setting storage unit 125 stores each piece of the compressed data generated by the compressing unit 124 into each of the storage locations (in the registry or the DEVMODE structure). The DEVMODE structure includes a public DEVMODE (public area) which is a fixed area whose usage is determined by the OS 105, and a private DEVMODE (private area) which is a free area in which a creator of a driver can freely manage information. In the first embodiment, the compressed data stored in the DEVMODE structure is stored in the private area of the DEVMODE structure.

The compressed data obtaining unit 126 reads the compressed data stored in the registry and the DEVMODE structure.

The decompressing unit 127 decompresses the compressed data obtained by the compressed data obtaining unit 126 from the registry and the DEVMODE structure, and expands the data onto an internal memory.

The drawing module 112 includes a compressed data obtaining unit 131, a decompressing unit 132, and a print data generating unit 133.

The compressed data obtaining unit 131 reads the compressed data stored in the registry and the DEVMODE structure.

The decompressing unit 132 decompresses the compressed data obtained by the compressed data obtaining unit 131 from the registry and the DEVMODE structure, and expands the data onto the internal memory.

The print data generating unit 133 validates print settings, whether the decompressed print settings (current setting values) comply with the constraints so as to generate print data that can be interpreted by the printer 150 based on the validated print settings and the drawing data requested to be printed by the application 104. The generated print data is transmitted to the printer 150 via the communicating unit 103.

The setting information (the layout information, the storage location information, and the function information) will now be explained using some specific examples.

Layout Information

FIG. 4 is a schematic of an example of the layout information. In the example of FIG. 4, only a part of the layout information is illustrated. The layout information illustrated in FIG. 4 is described in the JavaScript Object Notation (JSON) format, but may be described in any other format.

As illustrated in FIG. 4, in the layout information, layout data is specified for each GUI component to be displayed in the print setting window. The layout data has attributes of a type, a name, and an axis.

The type specifies a type of a GUI component. CheckBox, which is a value of the type, specifies that the GUI component is displayed as a check box component. ComboBox specifies that the GUI component is displayed as a combo box component. SpinBox specifies that the GUI component is displayed as a spin box component. A GUI component may also be displayed as an edit box component or a list box component, although not illustrated, by specifying EditBox or ListBox in the type.

The name represents the name of a setting. Out of the values of the name, "duplex" indicates that the setting is for double-sided printing. "Orientation" indicates that the setting is for specifying an orientation of a print. "Copies" indicate that the setting is for specifying the number of copies. "Papersize" or "layout", not illustrated, may also be described to specify a setting for a paper size or an aggregate print setting.

The axis represents the coordinates at which the GUI component is displayed, where x, which is an attribute of the axis, indicates a horizontal coordinate with the point of origin at the upper left corner of the dialog box, and y, which is also an attribute of the axis, indicates a vertical coordinate with the point of origin at the upper left corner of the dialog box. For example, the axis in the double-sided print setting (duplex) illustrated in FIG. 4 specifies that the check box component, specified by the type attribute, is displayed at horizontal position of 25 and a vertical position of 30.

The setting window displaying unit 121 reads the layout information from the storage unit 102, generates a setting window corresponding to the read layout information, and displays the generated print setting window onto a display apparatus (not illustrated) on the PC 100. At this time, the print setting module 111 only displays those permitted to set based on the function information, which is described later, among the GUI components described in the layout information.

Figures 5, 6:
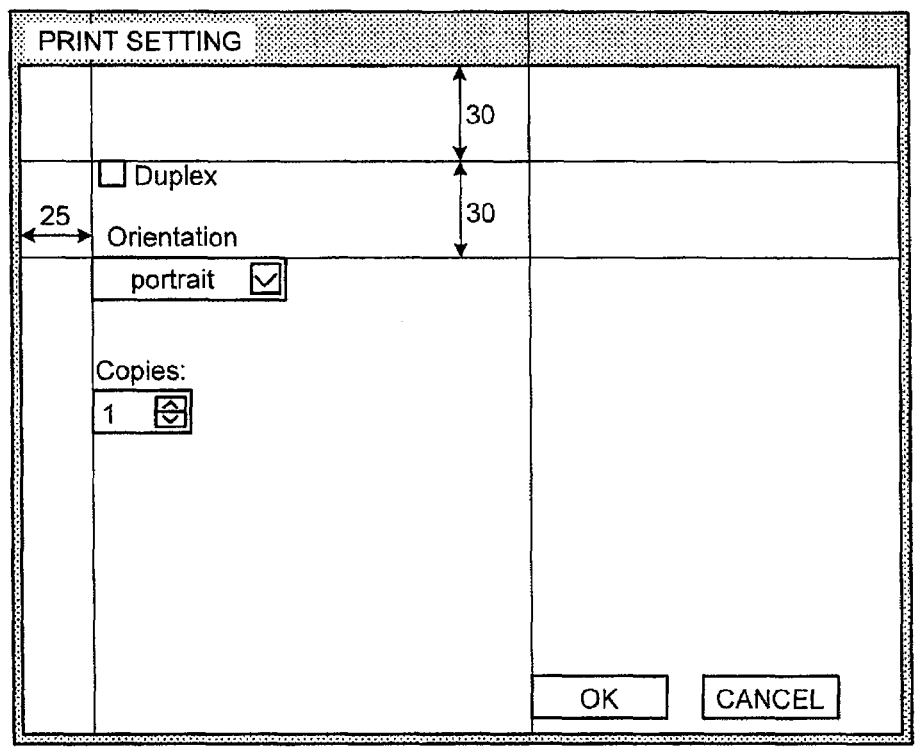
FIG. 5 is a schematic of an example of a print setting window based on the layout information illustrated in FIG. 4 and function information illustrated in FIG. 7.
FIG. 6 is a schematic of an example of storage location information according to the first embodiment.

FIG. 5 is a schematic of an example of a print setting window displayed by the setting window displaying unit 121 included in the printer driver 106, by reading the layout information illustrated in FIG. 4 and the function information illustrated in FIG. 7 explained later. As illustrated in FIG. 5, the check box component is displayed under the display name "Duplex" for the double-sided print setting, a combo box component is displayed under a display name "Orientation" for the print orientation setting, and a spin box component is displayed under a display name "Copies" for the number of copies setting. (Default setting values of the print orientation setting and the number of copies setting depend on the function information that are to be described later). The OK button illustrated in FIG. 5 is a button for storing the modified print settings, and the Cancel button is for cancelling such modifications.

Storage Location Information

The storage location information describes therein information specifying a storage location for each of the setting values. FIG. 6 illustrates an example of only a part of the storage location information. In the example illustrated in FIG. 6, the storage location information is described in the JSON format, but may be described in any other format.

In the storage location information, the name of each of the settings described in sections under keys "registry" and "devmode" corresponds to the name of each of the settings specified in the layout information and the function information. The setting value corresponding to the name of each of the settings described under the key "registry" (finisher, hdd, fold . . . in the example illustrated in FIG. 6) is stored in the registry. The setting value corresponding to the name of each of the settings described under the key "devmode" (duplex, orientation, . . . in the example illustrated in FIG. 6) is stored in the DEVMODE structure. The "finisher", "hdd", and "fold" represents a finisher, a hard disk, and a paper folder that are the functions included in the printer 150.

Function Information

FIG. 7 is a schematic of an example of the function information. In FIG. 7, to simplify explanations, only the double-sided printing (duplex), the print orientation setting (orientation), and the number of copies setting (copies) are illustrated. However, the function information is the information for specifying a range of a setting value permitted to be set for each of the setting values, and constraints among the settings. In practice, various types of information related to printing, such as a paper size setting or a stapling setting, is described in the function information. The function information illustrated in FIG. 7 is described in the Extensible Markup Language (XLM) format, but may be described in any other format (e.g., JSON).

In the example of the function information illustrated in FIG. 7, each piece of setting information is defined by a "feature" tag. The "feature" tag has attributes of a name, a default, and a type. Needless to say, the example illustrated in FIG. 7 is just an example, and other attributes can also be defined and used.

The attribute "name" represents the name of a setting, and corresponds to the "name" in the layout information. In the example illustrated in FIG. 7, the value "duplex" in the attribute "name" specifies that the setting is for double-sided printing. The value "orientation" specifies the print orientation setting. The value "copies" specifies the number of copies setting. The attribute "default" specifies an initial value among alternatives. The attribute "type" specifies the format in which a setting value is input. "pickone", which is a value in the "type", specifies an alternative format. In addition to the "pickone", "string" for specifying an input format in a character string, or "number" for specifying an input format in a number is available.

The "pickone" tag indicates that the setting values can be selected, and such setting values are specified under the attribute "name" in the "pickone" tag. In the print orientation setting, the attribute "pickone name" of the "pickone" takes a value "portrait" representing a vertical orientation, or a value "landscape" representing a horizontal orientation. In the double-sided printing, "off" represents that the function is OFF, and "on" represents that the function is ON. In the number of copies setting, "min" represents the minimum number of copies, and "max" represents the maximum number of copies.

A "constraint" tag, which is not illustrated, may be specified in the part enclosed by the "feature" tags. A part described using the "constraint" tags specifies information about a constraint in a setting enclosed by the "feature" tags, which is a parent tag (example: <constraint fixvalue="off">). The "fixvalue", which is an attribute in the "constraint" tag, allows a setting value to be changed forcibly thereto when a constraining condition is met ("off" in the example above).

A constraining condition can be specified using a "condition" tag in the part enclosed by the "constraint" tags (example: <condition expression="AAAA!="on"">). The "condition" tag specifies a constraining condition for the "constraint" tag, which is a parent tag. An attribute "expression" may be used to specify the condition (in the example above, the condition is met when a setting AAAA takes a value other than "on"). The "constraint" tag may also be specified in a part enclosed by the "pickone" tags, and in a "pickone" tag itself, in other words, the alternatives themselves can have the constraint information.

As described above, the function information specifies information for managements that should be performed by the printer driver 106 in relation to each of the print-related settings. The function information is provided for each supported model of a printer, and describes all functions included in each of the printers, including options thereof. The print setting module 111 and the drawing module 112 refer to the function information upon determining the functions that are permitted to use or upon validating the setting values (current values).

Operation (Setting) Performed by Print Setting Module 111

An operation (setting) performed by the print setting module 111 included in the printer driver 106 according to the first embodiment will now be explained with reference to FIG. 8. FIG. 8 is a flowchart of the operation (setting) performed by the print setting module 111.

To begin with, a working area for temporarily storing therein setting values and the like is reserved in the internal memory on the PC 100 (Step S801).

When a user makes an operation to launch the print setting window, the setting window displaying unit 121 causes the print setting window (GUI) to be displayed on the display apparatus (not illustrated) connected to the PC 100 (Step S802).

The setting window displaying unit 121 then accepts a setting operation of setting values (e.g., a change in a setting) performed by the user via the displayed print setting window (GUI) (Step S803).

The input setting values are then stored in the internal memory on the PC 100 (Step S804).

If the user operation is ended (for example, if the "OK" button is pressed on the print setting window illustrated in FIG. 5) (YES at Step S805), the system control proceeds to Step S806. If not (NO at Step S805), the system control goes back to Step S803, and continues accepting a setting operation of the user.

At Step S806, the assigning unit 122 refers to the storage location information, and assigns each of the setting values to the storage location (the registry or the DEVMODE structure) associated to the name of the setting. In other words, in the storage location information such as the one illustrated in FIG. 6, a setting value corresponding to the name of a setting specified in the section under the key "registry" is assigned to the registry as its storage location, and a setting value corresponding to the name of a setting specified in the section under the key "devmode" is assigned to the DEVMODE structure as its storage location.

The character string generating unit 123 then converts each of the setting values stored in the registry and each of the setting values stored in the DEVMODE structure into character strings (Step S807).

The compressing unit 124 then compresses the setting values converted into character strings by means of zipping, for example (Step S808).

The setting storage unit 125 then stores the compressed setting values (compressed data) in the respective storage locations (the registry and the DEVMODE structure) (Step S809).

The setting operations performed by the print setting module ill of the printer driver 106 are as explained above.

Operation (Displaying GUI) Performed by Print Setting Module 111

An operation (displaying a GUI) performed by the print setting module 111 included in the printer driver 106 according to the first embodiment will now be explained with reference to FIG. 9. FIG. 9 is a flowchart of the operation (displaying a GUI) performed by the print setting module 111.

To begin with, the compressed data obtaining unit 126 determines if the compressed data according to the first embodiment is present in the private area of the DEVMODE structure (abbreviated as DEVMODE in FIG. 9 and hereinafter). If it is present (YES at Step S901), the system control proceeds to Step S902. If not (NO at Step S901), the system control proceeds to Step S903.

At Step S902, the compressed data obtaining unit 126 obtains the compressed data of the setting values stored in the DEVMODE structure.

At Step S903, the compressed data obtaining unit 126 determines if the compressed data according to the first embodiment is present in the registry. If it is present (YES at Step S903), the system control proceeds to Step S904. If it is not present (NO at Step S903), the system control proceeds to Step S905.

At Step S904, the compressed data obtaining unit 126 obtains the compressed data of the setting values stored in the registry.

The decompressing unit 127 then decompresses the compressed data obtained at Step S902 and Step S904, and expands the data onto the internal memory (Step S905).

The setting window displaying unit 121 then displays the print setting window (GUI) by using the setting values expanded on the internal memory (Step S906). At the time thereafter, a user can change the setting values already set via the print setting window. The GUI is displayed using the default setting values at the initial setting. When the print setting window is displayed, the GUI components are displayed only for the functions permitted to be used under the constraints, and for the settings permitted to be set (the range of the settings, the setting values) based on the function information. The functions permitted to be used under the constraints, and settings permitted to be set (the range of the settings, the setting values) are determined by way of validation performed based on the function information.

The operation performed by the print setting module 111 in the printer driver 106 upon displaying the print setting window again is as explained above.

Operation Performed by Drawing Module 112

Figure 10:
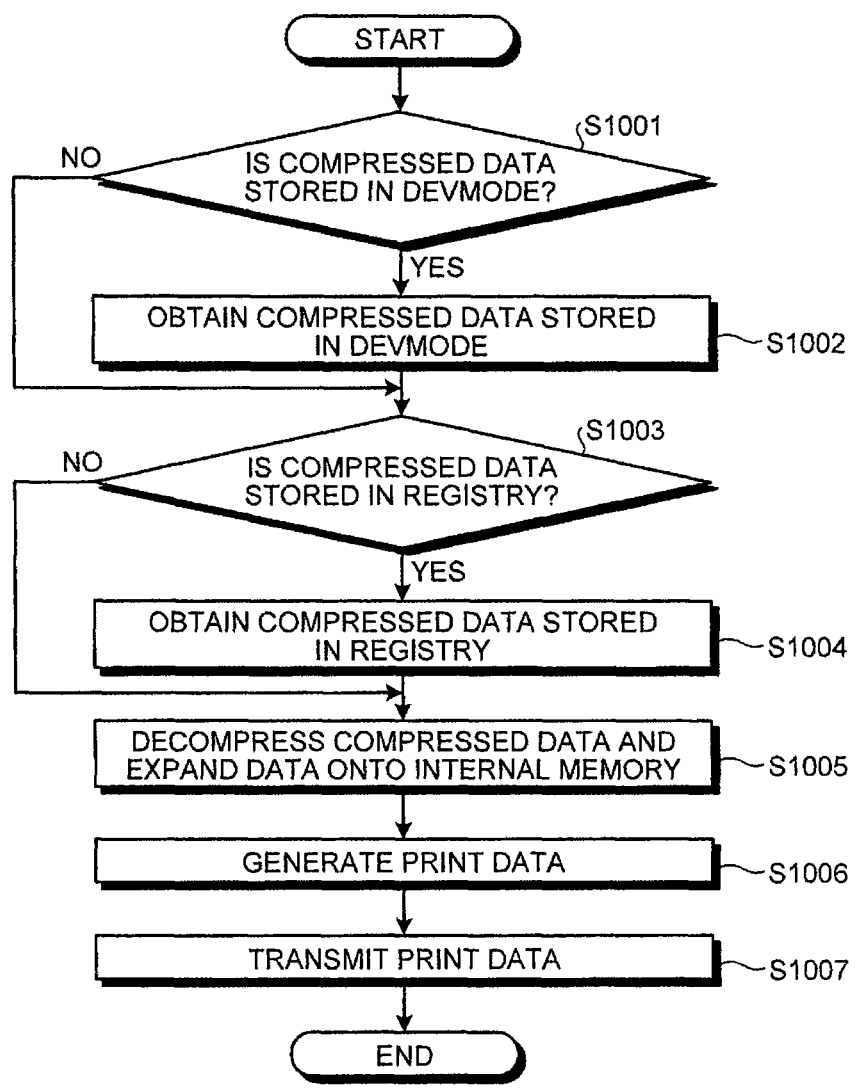
FIG. 10 is a flowchart for explaining an operation performed by a drawing module according to the first embodiment.

An operation performed by the drawing module 112 included in the printer driver 106 according to the first embodiment will now be explained with reference to FIG. 10. FIG. 10 is a flowchart of the operation performed by the drawing module 112. In the explanation below, it is assumed that the drawing module 112 has already accepted the drawing data, as well as the print request, from the application 104.

To begin with, the compressed data obtaining unit 131 determines if the compressed data according to the first embodiment is present in the private area of the DEVMODE structure. If it is present (YES at Step S1001), the system control proceeds to Step S1002. If it is not present (NO at Step S1001), the system control proceeds to Step S1003.

At Step S1002, the compressed data obtaining unit 131 obtains the compressed data of the setting values stored in the DEVMODE structure.

The compressed data obtaining unit 131 then determines if the compressed data according to the first embodiment is present in the registry. If it is present (YES at Step S1003), the system control proceeds to Step S1004. If it is not present (NO at Step S1003), the system control proceeds to Step S1005.

At Step S1004, the compressed data obtaining unit 131 obtains the compressed data of the setting values stored in the registry.

The decompressing unit 132 then decompresses the compressed data obtained at Step S1002 and Step S1004 respectively, and expands the data onto the internal memory (Step S1005).

The print data generating unit 133 then generates the print data interpretable by the printer 150 based on the setting values (current values) expanded on the internal memory and reflected with the constraints specified in the function information, and the drawing data received from the application 104 (Step S1006).

Finally, the print data generating unit 133 transmits the generated print data to the printer 150 (Step S1007).

The operation performed by the drawing module 112 included in the printer driver 106 is thus explained above.

Figure 11:
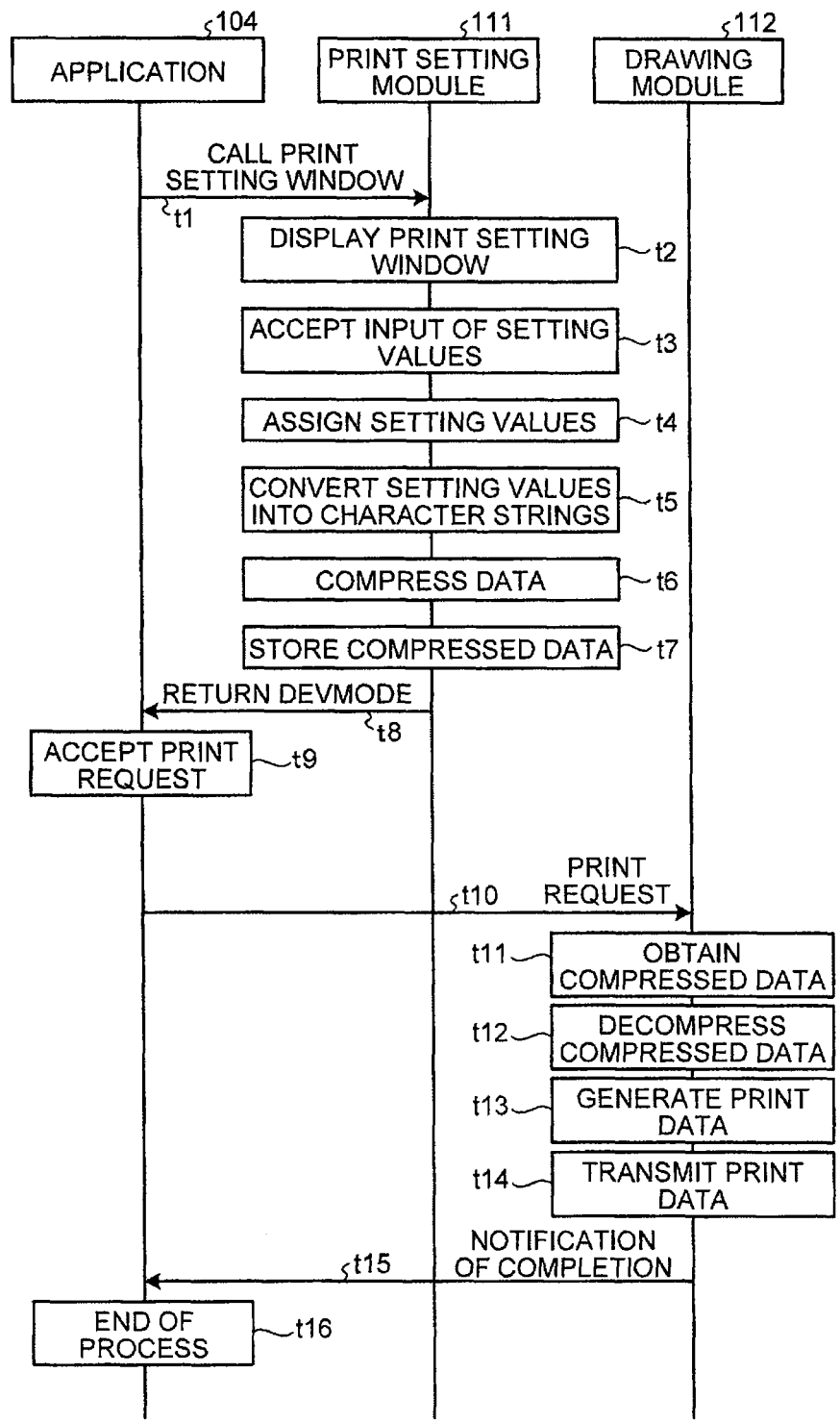
FIG. 11 is a sequence diagram for explaining an operation performed by the printer driver in response to a call for the print setting window and a print request issued by an application according to the first embodiment.

An internal operation performed by the printer driver 106 in response to a call for the print setting window and a print request issued by the application 104 will now be explained with reference to the sequence diagram in FIG. 11, in association with an operation of the application 104. The operations performed by the print setting module 111 and the drawing module 112 are mainly executed by the setting window displaying unit 121, the assigning unit 122, the character string generating unit 123, the compressing unit 124, the setting storage unit 125, the compressed data obtaining unit 126, the decompressing unit 127, the compressed data obtaining unit 131, the decompressing unit 132, and the print data generating unit 133.

In response to the user issuing a print setting request to the printer 150, the application 104 issues a call for the print setting window to the print setting module 111 to cause the print setting window, allowing the user to perform the print setting for the printer 150, to be displayed (t1).

Upon receiving the call for the print setting window from the application 104, the print setting module 111 generates the setting window for allowing the user to provide various settings to the functions of the printer 150, based on the layout information and the function information, and displays the setting window onto the display unit (not illustrated) on the PC 100 (t2). At this time, as described earlier, the GUI components are displayed only for the functions permitted to be used under the constraints, and for the settings permitted to be set (the range of the settings, the setting values) based on the function information.

The print setting module 111 then accepts the print setting values for the printer 150, input by the user via the print setting window (t3).

When the user completes entering the print settings (for example, when the OK button is pressed in the print setting window), the print setting module 111 refers to the storage location information stored in the storage unit 102, and assigns the setting values entered by the user to the respective storage locations (the registry and the DEVMODE structure) (t4).

In the print setting module 111, the setting values assigned at t4 are converted into character strings for each of the assigned locations (t5), and the setting values converted into the character string is compressed by way of zipping, for example (t6).

The compressed setting values (compressed data) are respectively stored in their storage locations (the registry and the DEVMODE structure) (t7).

The print setting module 111 then sends back the DEVMODE structure in which the compressed data is returned to the application 104 (t8).

When the user subsequently issues a print request on the application 104 for the printer 150, the application 104 accepts the print request (t9), and the print request is transferred from the application 104 to the drawing module 112 (t10). At this time, the drawing data is sent along with the print request.

Upon receiving the print request, the drawing module 112 reads the compressed data stored in the registry and the DEVEMODE structure, to obtain the compressed data respectively (t11).

The drawing module 112 then decompresses the obtained compressed data and expands the data onto the internal memory (t12).

The drawing module 112 then refers to the function information for the printer 150 stored in the storage unit 102, validates the expanded setting values (current values), and reflects the constraints specified in the function information to the setting values (current values). The drawing module 112 then generates the print data that can be interpreted by the printer 150 from the setting values and the drawing data (t13).

The generated print data is then transmitted from the drawing module 112 to the printer 150 via the communicating unit 103 (t14).

After transmitting the print data, the drawing module 112 transmits a notification of completion of the print data transmission to the application 104 (t15).

Upon receiving the notification of completion of the print data transmission from the drawing module 112 (t15), the application 104 ends printing process (t16).

The internal operation performed by the printer driver 106 in response to the call for the print setting window and the print request issued by the application 104 is thus explained above in association with the operation of the application 104.

As described above, in the first embodiment, each of the setting values related to the print settings is paired with the name of the setting so as to be converted into a character string of a variable length, compressed, and stored (especially in a data structure such as the DEVMODE structure). In this manner, even if the number of setting values to be stored is increased along with an increase in a function of the printer (as long as such an increase is not an extreme one), the size of the data structure (DEVMODE structure) storing therein the setting value does not need to be changed, unlike the conventional example. In other words, the data structure does not have to be re-designed, and the printer driver 106 does not need to be re-created. Furthermore, because each of the setting values is paired with the name of the setting as a character string, the setting values can be extracted easily after the compressed data is decompressed.

Second Embodiment

A second embodiment of the present invention will now be explained with reference to FIGS. 12 to 20. A hardware configuration according to the second embodiment is the same as that according to the first embodiment. Therefore, only the elements that are different from those in the first embodiment are explained below.

DEVMODE Structure

Figure 12:
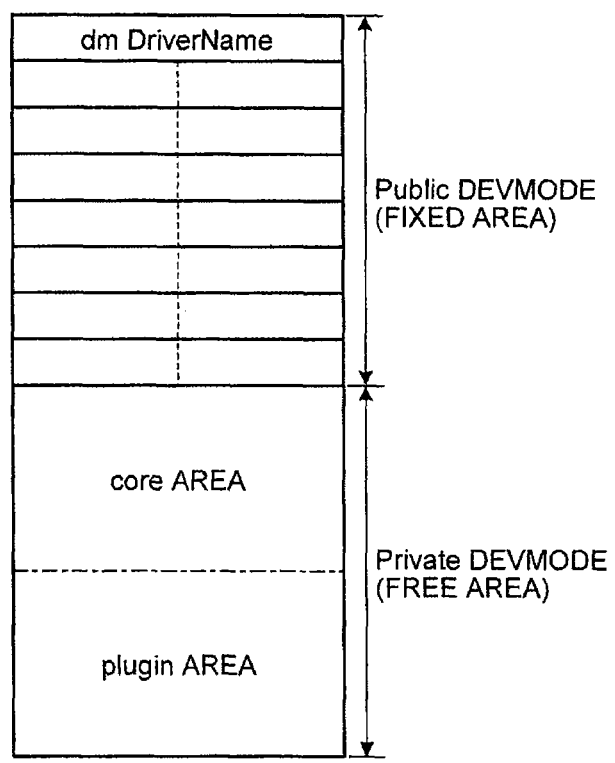
FIG. 12 is a schematic of a DEVMODE structure according to a second embodiment of the present invention.

FIG. 12 is a schematic of a DEVMODE structure according to the second embodiment. As illustrated in FIG. 12, PrivateDEVMODE, which is the private area in the DEVMODE structure, is divided into a core area and a plugin area. Setting values before a plug-in extension is added are stored in the core area. Setting values after a plug-in extension is added are stored in the plugin area. Therefore, the storage location information according to the second embodiment will be as explained below.

Storage Location Information

Storage location information describes information specifying a storage location for each of the setting values, in the same manner as in the first embodiment. In FIG. 13, only a part of the exemplary storage location information is illustrated. In the example illustrated in FIG. 13, the storage location information is described in the JSON format, but may be described in any other format.

Figure 14:
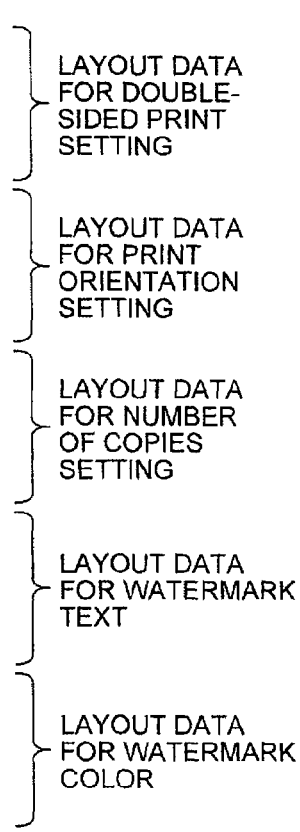
FIG. 14 is a schematic of an example of layout information according to the second embodiment.

The names of the settings specified in the sections under the keys "registry", "devmode", and "plug-in" in the storage location information correspond to the settings specified in the layout information and the function information (see FIGS. 14 and 15). The setting value corresponding to the name of each of the settings described under the key "registry" (finisher, hdd, fold . . . in the example illustrated in FIG. 13) is stored in the registry. The setting value corresponding to the name of each of the settings described under the key "devmode" (duplex, orientation, . . . in the example illustrated in FIG. 13) is stored in the core area in the DEVMODE structure. The setting value corresponding to the name of each of the settings described under the key "plug-in" (watermark_text, watermark_color, . . . in the example illustrated in FIG. 13) is stored in the plugin area in the DEVMODE structure. In the explanation of the second embodiment, a function for printing a watermark is added by means of a plug-in; however, any function may be added by means of a plug-in.

In this manner, the keys "registry", "devmode", and "plug-in" are used to specify storage locations. The setting values corresponding to the names of settings described under these keys are respectively stored in the storage locations specified by these keys. The "watermark_text" and "watermark_color" respectively correspond to a text to be printed as a watermark and a color of the text.

In the exemplary layout information illustrated in FIG. 14, layout data for the watermark text setting and layout data for the watermark color setting are additionally provided in the layout information illustrated in FIG. 4 according to the first embodiment, as sections for describing layout data for GUI components (combo boxes in the example illustrated in FIG. 14) allowing the user to set a text to be printed as a watermark and a color of the text, and corresponding to watermark_text and watermark_color.

Figure 16:
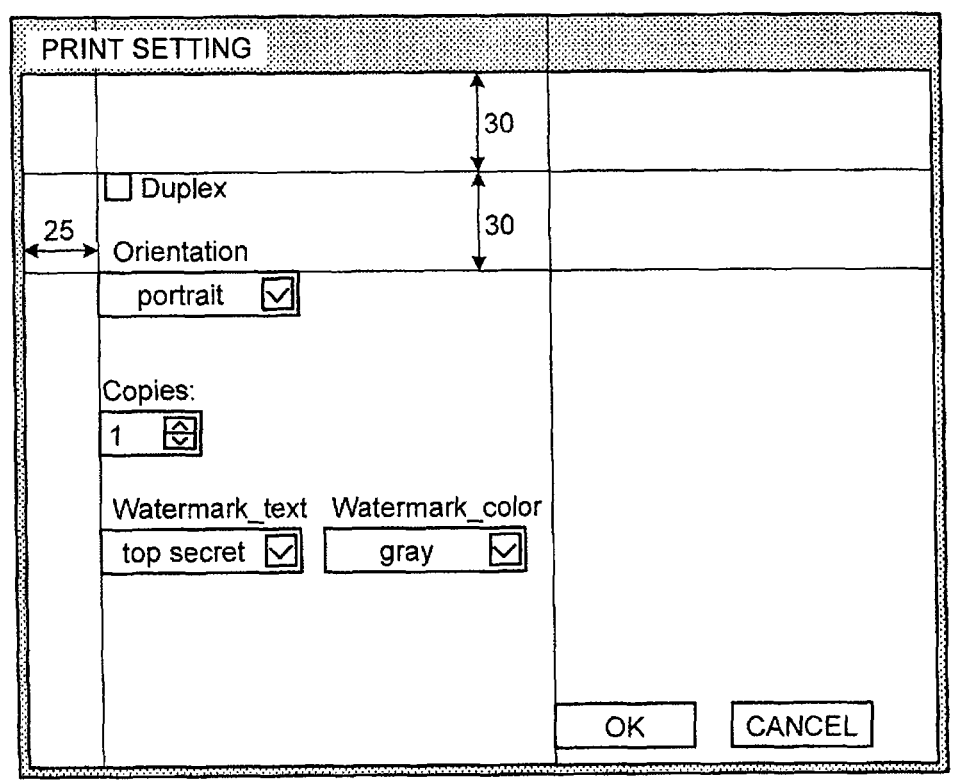
FIG. 16 is a schematic of an example of a print setting window based on the layout information illustrated in FIG. 14 and the function information illustrated in FIG. 15 according to the second embodiment.
Figure 17:
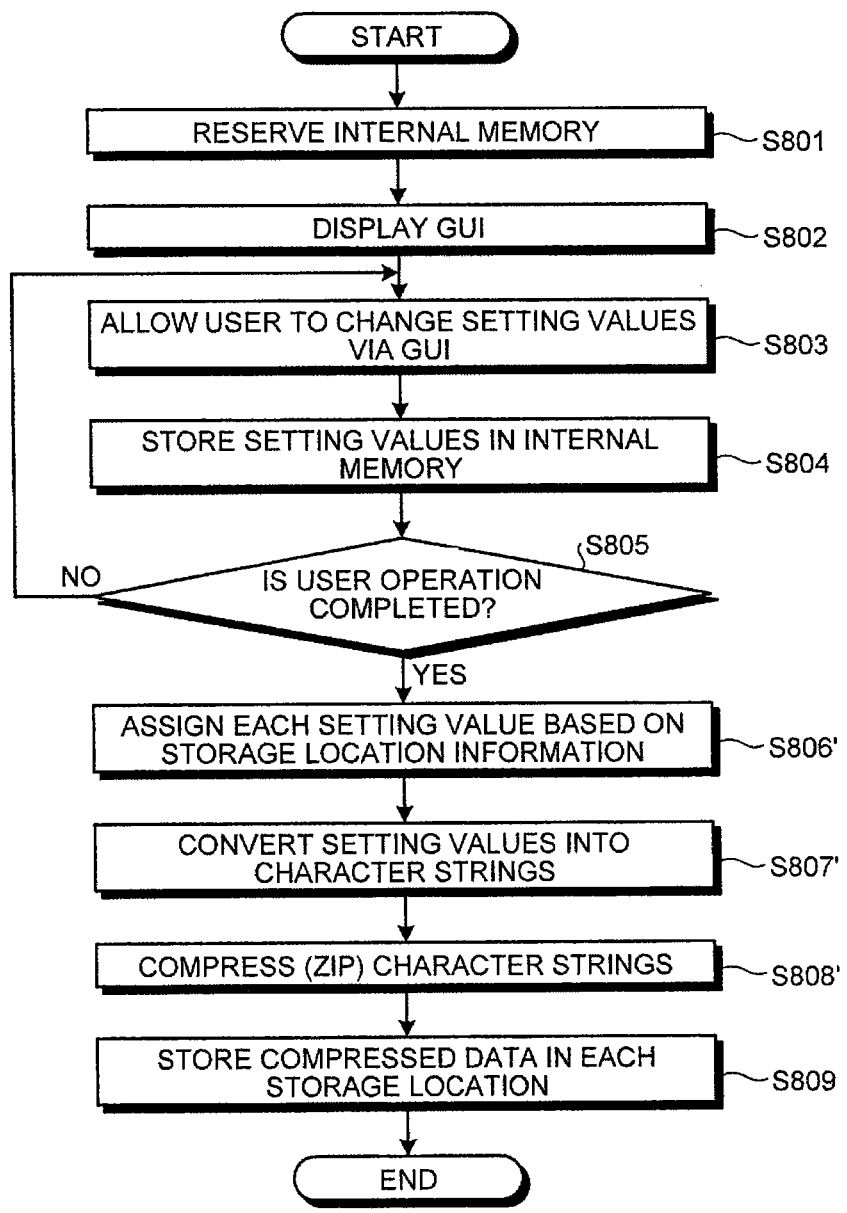
FIG. 17 is a flowchart for explaining an operation (setting) performed by a print setting module according to the second embodiment.

In the exemplary function information illustrated in FIG. 15, setting information corresponding to watermark_text and watermark_color is added to the function information illustrated in FIG. 7 according to the first embodiment, so as to provide definitions of watermark_text and watermark_color. In the example illustrated in FIG. 15, the function information specifies selectable setting values that can be selected on the GUI components (combo boxes in this example) for selecting a text to be printed as a watermark and a color of the text (in the example illustrated in FIG. 15, "top secret", "confidential", and so on are defined as alternatives for a watermark text, and "gray", "red", and so on are defined as alternatives for a watermark color). FIG. 16 is a schematic of an exemplary print setting window displayed by the setting window displaying unit 121 included in the printer driver 106 by reading the layout information and the function information respectively illustrated in FIGS. 14 and 15. The alternatives and default setting values provided in the print setting window are determined by the function information.

Operation (Setting) Performed by Print Setting Module 111

An operation (setting) performed by the print setting module 111 included in the printer driver 106 according to the second embodiment will now be explained.

The operation performed by the print setting module 111 according to the second embodiment is different from the operation performed by the print setting module 111 according to the first embodiment in specific steps performed at Steps S806 to S808 illustrated in FIG. 8. The basic flow of the operation is the same as the one illustrated in FIG. 8. Therefore, Steps S806' to S808'(FIG. 17) performed by the print setting module 111 according to the second embodiment corresponding to Steps S806 to S808 illustrated in FIG. 8 will be explained below in detail.

The second embodiment is the same as the first embodiment in that the assigning unit 122 refers to the storage location information, and assigns each of the setting values to the storage location associated with the name of the setting. However, because the private area of the DEVMODE structure, which is a storage location, is divided into the core area and the plugin area, there are three storage locations, the registry, the core area and the plugin area in the private area of the DEVMODE structure in the second embodiment, unlike two storage locations, the registry and the private area of the DEVMODE structure in the first embodiment. However, in the second embodiment, at Step S806', the assigning unit 122 refers to the storage location information, and assigns each of the setting values to the storage location associated to the name of the setting (the registry, or the core area or the plugin area in the DEVMODE structure), following the keys ("registry", "devmode", and "plugin") specified in the storage location information.

At Step S807', the character string generating unit 123 converts the setting values stored in the registry, the core area, and the plugin area in the DEVMODE structure into character strings, respectively.

At Step S808', the compressing unit 124 compresses each of the setting values converted into a character string corresponding to each of the storage locations by way of zipping, for example. The compressed data thus generated is then stored in the corresponding storage locations.

Operation (Displaying GUI) Performed by Print Setting Module 111

The operation (displaying a GUI) performed by the print setting module 111 included in the printer driver 106 according to the second embodiment (FIG. 18) is different from the operation performed by the print setting module 111 according to the first embodiment in that the compressed data is obtained from three areas, that is, from the registry, the core area, and the plugin area, because the private area of the DEVMODE structure, which is a storage location, is divided into the core area and the plugin area. In other words, according to the second embodiment, the compressed data is obtained from the core area and the plugin area in the DEVMODE structure (Step S902') during the step corresponding to Step S902 according to the first embodiment illustrated in FIG. 9. The remaining steps are the same as those according to the first embodiment.

Unlike the example described below, in which a plug-in extension is made but any compressed data in the plugin area is not required in the operation, the operation explained herein requires the compressed data in the plugin area. Therefore, the compressed data is obtained from the core area and the plugin area in the DEVMODE structure. If a plug-in extension is not made, or if a plug-in extension having no setting value is made, no compressed data is stored in the plugin area. Therefore, the compressed data would be obtained only from the core area.

Operation (Executing Validation without Displaying GUI) Performed by Print Setting Module 111

Some commands passed from the application to the printer driver cause the print setting module 111 to display GUI, and some do not. Some commands also do not require any compressed data in the plugin area (including information about the setting values). As an example of such an operation, a validating operation performed by the print setting module 111, without causing a GUI to be displayed, is illustrated in FIG. 19.

Figure 19:
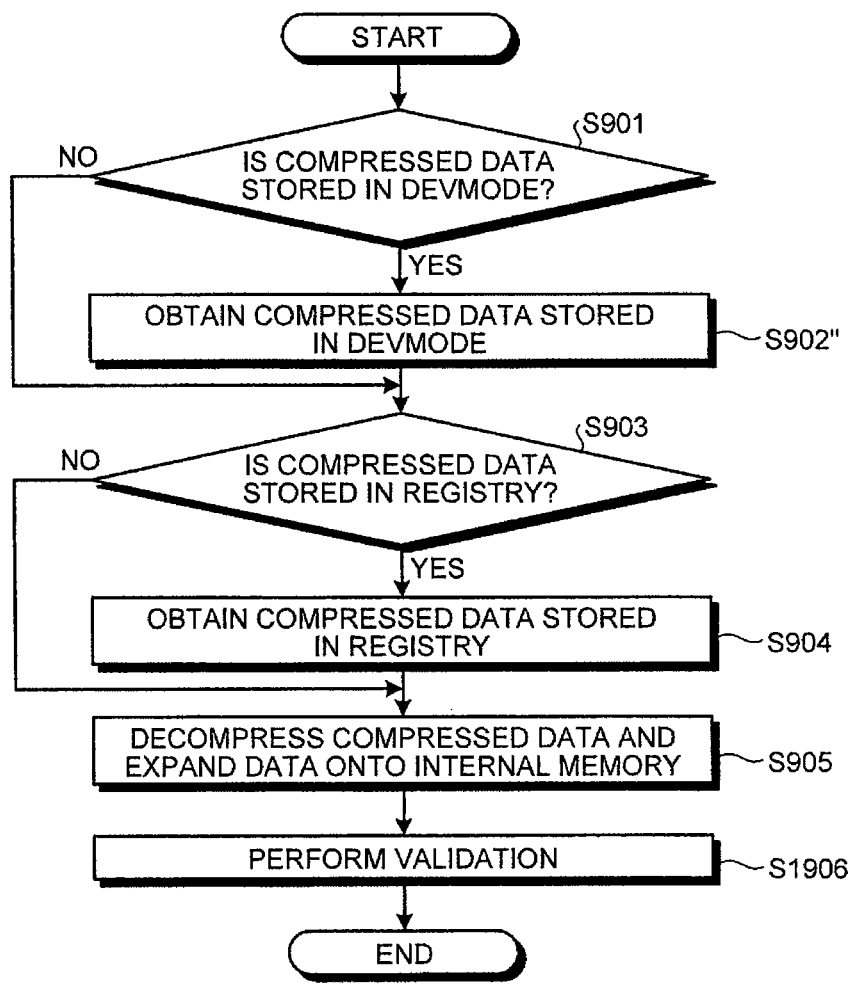
FIG. 19 is a flowchart for explaining an operation (executing Validation without displaying a GUI) performed by the print setting module according to the second embodiment.

One of the differences between the operation illustrated in FIG. 19 and the above-described operation (displaying a GUI) performed by the print setting module 111 is that the print setting module 111 obtains the compressed data only from the core area but not from the plugin area at Step S902'' as illustrated in FIG. 19, corresponding to Step S902' explained above. This kind of operations is performed, for example, when a plug-in not requiring the setting values thereof to be processed (to be validated, in this example) is used. In such a configuration, the print setting module 111 obtains the compressed data only from the core area even when a plug-in is installed. Because some commands issued by the application do not require the compressed data stored in the plugin area, only necessary data stored in the core area is obtained in this exemplary operation, even if the compressed data is stored in both of the core area and the plugin area. In this manner, speed performance is improved, compared with a configuration in which the compressed data is obtained from both of the core area and the plugin area.

Figure 18:
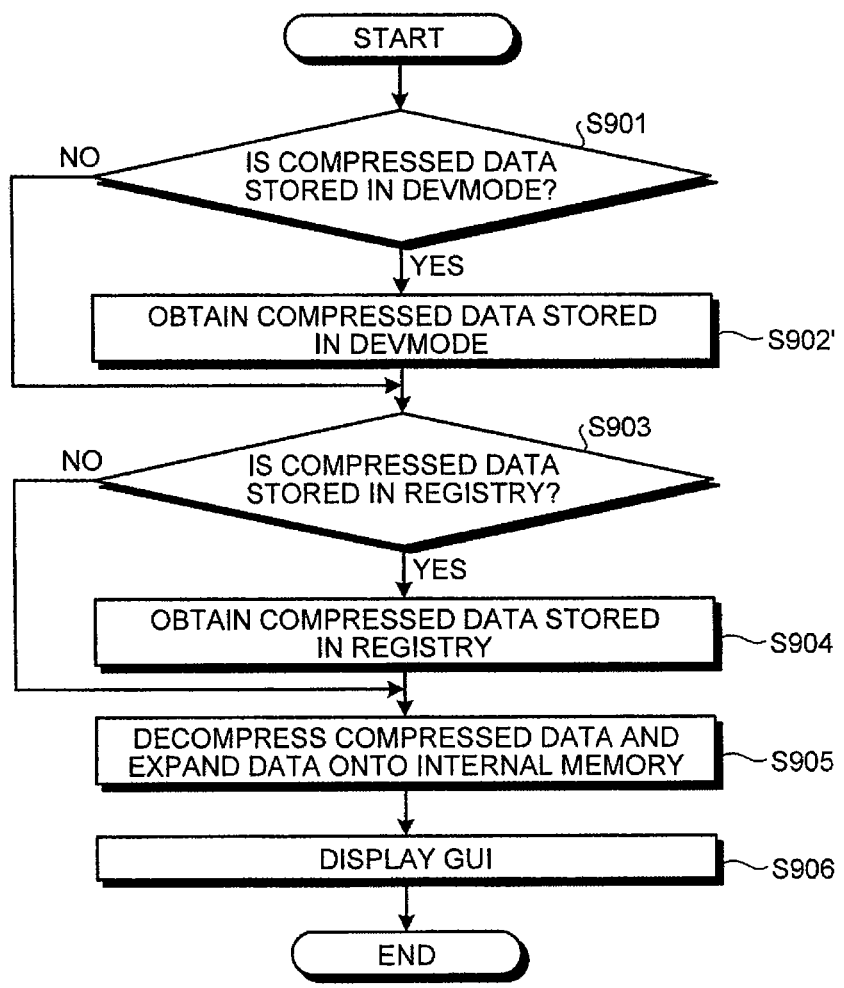
FIG. 18 is a flowchart for explaining an operation (displaying a GUI) performed by the print setting module according to the second embodiment.

Another difference is that only validation is performed without displaying a GUI at Step S1906 in FIG. 19 corresponding to Step S906 illustrated in FIG. 18. This validation is performed to determine the functions permitted to use, and the settings permitted to be specified (the range of the settings, the setting values) under the constraints. Other steps are the same as those illustrated in FIGS. 9 and 18.

The operations performed by the print setting module 111 are not limited to the examples explained above. The operations performed by the print setting module 111 are not limited to the examples explained with reference to FIGS. 18 and 19, and, if the application issues a command not requiring the setting values that are added when the functions are extended by means of a plug-in, speed performance can be improved by allowing the print setting module 111 to obtain the data only from the core area during a process corresponding to such a command.

Operation Performed by Drawing Module 112

An operation performed by the drawing module 112 included in the printer driver 106 according to the second embodiment is different from the operation performed by the drawing module 112 included in the printer driver 106 according to the first embodiment in that the compressed data is obtained from three areas, the registry, the core area, and the plugin area, because the private area in the DEVMODE structure, which is a storage location, is divided into the core area and the plugin area. In other words, at a step corresponding to Step S1002 according to the first embodiment illustrated in FIG. 10, the compressed data is obtained from both of the core area and the plugin area in the DEVMODE structure (Step S1002'). Other steps are the same as those in the flowchart in FIG. 10 according to the first embodiment. If no plug-in extension is made, or if a plug-in extension not accompanying any setting value is made, the compressed data is obtained only from the core area because no compressed data is stored in the plugin area.

The series of steps explained above with reference to FIG. 11 and performed by the printer driver according to the first embodiment in response to a call for the print setting window and a print request issued by the application are the same in the second embodiment.

The differences between the first and the second embodiment are thus explained above. In the second embodiment as well, each of the setting values related to print settings (especially those stored in the data structure such as the DEVMODE structure) is paired with the name of the setting to be converted into a character string of a variable length, and the character string is compressed and stored, in the same manner as in the first embodiment. In the second embodiment, however, the storage location for the compressed data in the data structure (the DEVMODE structure) is divided into two areas (the core area and the plugin area), and the setting values before a plug-in extension is made are stored in the core area, and the setting values added when the functions are extended by means of a plug-in are stored in the plugin area. In this configuration, even if the functions are extended by means of a plug-in, the performance in speed can be improved by obtaining the data only from the core area when the setting values added when the functions are extended by means of a plug-in are not required.

The printer driver 106 according to the embodiments is recorded in an installable or an executable format and made available in a computer-readable recording medium such as a compact disk read-only memory (CD-ROM), a flexible disk (FD), a compact disk recordable (CD-R), or a digital versatile disk (DVD).

These computer programs may also be stored in a computer connected to a network such as the Internet, and made available for download over the network.

According to the present invention, even when the number of setting values is increased correspondingly to an increased number of printer functions, the setting values can be stored without changing the size of the data structure storing therein the setting values. Therefore, it is not necessary to re-design the data structure storing therein setting values, re-code and re-compile a printer driver, or re-distribute a modified printer driver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
 a display controlling unit that controls to display a setting screen based on functional information and setting screen information, wherein
   the functional information relates to function that an outputting device has, and
   the setting screen information relates to the setting screen on which an operation of an output setting for the outputting device to output is received;
 a transforming unit that transforms the output setting into a setting on a predetermined format based on the operation that is received through the setting screen;
 a memory controlling unit that stores the transformed setting on the predetermined format into a predetermined memory area of a storing device; and
 a generating unit that
   transforms the stored setting, which is stored by the memory controlling unit, into a setting that is described on an original format, and
   generates output target that requests the outputting device to output based on the setting that is transformed by the generating unit, and the functional information.

2. The information processing apparatus according to claim 1, wherein
 the storing device stores each functional information respectively corresponding to each one of the outputting devices therein, and
 the display controlling unit displays the setting screen based on
   functional information, which is stored by the storing device, that relates to the function that the outputting device has, and
   the setting screen information.

3. The information processing apparatus according to claim 1, wherein
 the functional information includes
   a scope of setting that the outputting device is able to receive as the request, or
   inhibited rule that is inhibited among each setting.

4. The information processing apparatus according to claim 1, wherein
 the setting screen information includes each display location information for each of displayed parts displayed on the setting screen.

5. The information processing apparatus according to claim 1, wherein
 the functional information or the setting screen information is of information described on text format.

6. A non-transitory computer-readable storage medium storing computer-readable instructions thereon, which, when executed by a computer, cause the computer to function as the information processing apparatus of claim 1.

7. A system comprising:
 the information processing apparatus according to claim 1; and
 an image processing apparatus that processes images.

* * * * *